United States Patent [19]

Westhaver et al.

[11] Patent Number: 4,499,778

[45] Date of Patent: Feb. 19, 1985

[54] FLEXURE MOUNT ASSEMBLY FOR A DYNAMICALLY TUNED GYROSCOPE AND METHOD OF MANUFACTURING SAME

[75] Inventors: Robert O. Westhaver, Westwood; Gary Walker; Menno G. Koning, both of Dover, all of Mass.

[73] Assignee: Northrop Corporation, Los Angeles, Calif.

[21] Appl. No.: 231,242

[22] Filed: Feb. 3, 1981

[51] Int. Cl.³ .............................................. G01C 19/22
[52] U.S. Cl. ...................................... 74/5 F; 228/135; 228/249; 464/100
[58] Field of Search ......................... 74/5 F; 308/2 A; 464/98, 100, 97, 117, 119, 136; 29/434, 436; 228/135, 249

[56] References Cited

U.S. PATENT DOCUMENTS

| | | | |
|---|---|---|---|
| 1,658,713 | 2/1928 | Fuller | 228/249 X |
| 2,116,195 | 5/1938 | Foster | 464/100 X |
| 2,757,050 | 7/1956 | Weber et al. | 308/2 |
| 2,819,892 | 1/1958 | Huff | 267/1 |
| 3,252,696 | 5/1966 | Friedel | 267/1 |
| 3,264,880 | 8/1966 | Fischel | 74/5 F |
| 3,452,608 | 7/1969 | Stiles | 74/5 F |
| 3,512,419 | 5/1970 | Stiles | 74/5 F |
| 3,515,006 | 6/1970 | Duck | 74/5 F |
| 3,524,355 | 8/1970 | Barnett et al. | 74/5 F |
| 3,543,301 | 11/1970 | Barnett | 74/5 F |
| 3,702,568 | 11/1972 | Howe | 74/5 F |
| 3,825,992 | 7/1974 | Troeger | 308/2 A X |
| 3,851,375 | 12/1974 | Koorneef | 228/249 X |
| 4,326,428 | 4/1982 | Bostwick et al. | 74/5 F |

FOREIGN PATENT DOCUMENTS

| | | | |
|---|---|---|---|
| 2818106 | 12/1978 | Fed. Rep. of Germany | 74/5 F |
| 794236 | 4/1958 | United Kingdom. | |
| 1142848 | 2/1969 | United Kingdom. | |

Primary Examiner—Rodney H. Bonck
Attorney, Agent, or Firm—Kenway & Jenney

[57] ABSTRACT

A flexure mount particularly adapted for use in a dynamically tuned gyroscope provides a universal coupling between a rotor element and a drive shaft. The mount features a substantially planar "spider" member oriented transversely to the spin axis of the rotor. The spider has four webs that each extend radially from an inner gimbal ring to a segmented outer ring having four independent sectors each associated with and centered on one of the webs. Two mutually perpendicular "vertical" or cross flexure members each have key portions that extend through radial slots in the webs of the spider. The inner gimbal ring and the spider have central apertures coaxial with the spin axis. An alignment member is seated in the aligned apertures. The vertical flexure members are seated in a set of mutually perpendicular and axially extending slots formed in the alignment member. The spider and the cross members are preferably etched or stamped from precision rolled sheet material. In the preferred form, the inner gimbal ring and the outer mounting ring are formed by substantially identical upper and lower halves which sandwich the spider. The halves each have a set of radially aligned slots formed in their opposed faces to receive the vertical cross members. The components of the flexure mount are self-jigging and self-aligning. Once assembled, all of the components are secured simultaneously with only one brazing operation, preferably one using preformed brazing foil.

21 Claims, 5 Drawing Figures

FLEXURE MOUNT ASSEMBLY FOR A DYNAMICALLY TUNED GYROSCOPE AND METHOD OF MANUFACTURING SAME

BACKGROUND OF THE INVENTION

This invention relates in general to flexure mounts for rotating members. More specifically it relates to a highly simplified flexure mount for a dynamically tuned gyroscope which provides excellent performance characteristics while being fabricated by simplified techniques.

In dynamically tuned gyroscopes it is necessary to provide a coupling between a driving shaft and a driven rotating member, typically a rotor, allowing two degrees of freedom for the rotor perpendicular to the spin axis of the shaft.

Such a coupling must satisfy a number of criteria. First, it must efficiently transfer rotational torque from the shaft to the rotor while at the same time securing the rotor in a generally predetermined location both axially and radially with respect to the shaft. Second, it must be elastic torsionally about any axis in a plane of rotation perpendicular to the spin axis. The coupling assembly must also provide an anti-spring effect which compensates for the spring coupling in the plane of rotation when the gyro is operating at its resonant speed. The coupling should also be substantially frictionless and isoelastic, that is, it should exhibit substantially uniform elasticity in any torsional direction perpendicular to the spin axis. It is also highly desirable to be able to calculate accurately the axial, radial and torsional stiffness of the suspension to design a suspension with the required isoelastic conditions.

U.S. Pat. Nos. 3,452,608 and 3,512,419 to Stiles and U.S. Pat. No. 3,702,568 to Howe describe several arrangements for achieving the aforementioned objectives. The Stiles '419 patent describes a "flexure hinge" which utilizes four arms each having a generally V-shaped cross-section. The outer ends of two of the arms are secured to mating mounting blocks fixed on the drive shaft. The outer ends of the two other arms are secured to mating blocks fixed on a rotor. In the '608 mounting system a central connecting ring secures four radially extending "hinges" each having a tubular configuration. One diametrically opposed pair of these hinges is secured to a rotor and the remaining hinges are secured to mounting brackets formed on the end of a drive shaft. The tubular hinges include a localized slot which enhances their flexure in the plane of rotation perpendicular to the spin axis.

The Howe suspension includes a generally flat "disk". It has a central portion secured to a "hub", intermediate "lands" secured to a gimbal ring, and an outer "annulus" secured to an "outermost" rotor ring or a rotor. A set of flat "spokes" connect the central portion of the disk to the outer annulus. Four other "spokes" connect the land portions to either the outer annulus or the central portion. Diametrically opposite pairs of these spokes connect the gimbal ring to the outer ring and the other two spokes connect the gimbal ring to the central hub. These latter four spokes are twisted so that the plane of each spoke is generally aligned with the spin axis. The hub, gimbal ring and outermost ring are formed in upper and lower halves. These components have suitable clearances and supporting slots machined in their facing surfaces which abut or are adjacent to the disk. The drive shaft is secured in a hole formed in the hub and the hub portion of the disk.

While the foregoing suspensions provide a universal coupling suitable for use in a dynamically tuned gyroscope, they each have deficiencies which limit their usefulness. For example, it is not simple to accurately align components of the gyroscope with the suspension system during assembly and manufacturing operations. In general, these prior art suspensions require relatively complex and costly jigs to align the component parts of the assembly and maintain that alignment during operations such as brazing or machining. The jig fixtures also typically include arrangements for controlling the placement and/or flow of brazing material to secure the parts to one another. Also, the performance of these systems is not optimal. In particular with respect to the tubular style hinges, it is difficult in practice to obtain a truly iso-elastic mount since the wall thickness and flexural qualities of the tubing are not readily maintained to extremely close tolerances. The Howe system, on the other hand, requires accurate and costly machining of what are typically very small components.

It is therefore a principal object of this invention to provide a flexure mount for a dynamically tuned gyroscope or the like which provides both the excellent performance characteristics usually associated with a highly machined one piece suspension while at the same time having a low cost of manufacture.

Another object of the invention is to provide a flexure mount which is formed from only three basic elements, two of which can be identical and each of which can be formed from a sheet material and have a comparatively simple configuration.

Yet another object of the invention is to provide a flexure mount and a method of assembly for the mount which is to a large extent self-aligning.

Another object is to provide a flexure mount whose flexure characteristics can be comparatively easily calculated to facilitate design changes.

Yet another object of the invention is to provide a flexural mount which is assembled through simultaneous multiple brazings.

A further object of the invention is to provide a flexural mount that accepts inner and outer rings fabricated by straightforward machining operations.

SUMMARY OF THE INVENTION

A flexure mount for a dynamically tuned gyroscope or a similar precision apparatus provides a universal coupling that transmits rotational energy from a drive shaft to a rotor element. One piece of the mount is a substantially planar "spider" member that is oriented transversely to the spin axis of the rotor element. The spider has a central portion centered on the spin axis and several webs which extend radially from the central portion to an outer annular portion also centered on the spin axis. In the preferred form, the spider has four webs. The other two pieces of the flexure mount are cross-flexure members that are generally rectangular in configuration except for two generally rectangular "key" portions formed on one longitudinal edge and spaced equally from the center of the member. Each key portion extends freely through an associated radial slot formed along the center of each web. The spider and the cross flexure members are preferably etched from a rolled sheet material of uniform thickness and having substantially uniform flexural characteristics.

In manufacturing a flexure mount according to this invention, the central portion of the spider is sandwiched between an upper and lower half of a hub or inner ring (a gimbal ring of a gyroscope). In a like fashion, the outer annulus of the spider is sandwiched between an upper and lower half of an outer ring. The inner ring has a central cylindrical aperture which is coaxial with the spin axis. The central portion of the spider member likewise has a central aperture that has the same dimensions as the aperture of the inner ring. The upper and lower halves of the inner and outer rings have a series of radial slots that receive and locate the cross members.

These components are assembled with the cross flexure members in an orthogonal relationship with respect to one another and with respect to the spider member. The two key portions of one cross member project "upwardly" through two diametrically opposed radial slots in the webs and the two key portions of the other cross member extend "downwardly" through the remaining two slots. The key portions extend vertically a sufficient distance that the length of each cross member lying above and below the "horizontal" web of the spider is substantially the same.

An alignment member, preferably a cylindrical pin, is received in a close fitting relationship in the aligned central apertures of the inner gimbal ring and the spider. The pin has a set of longitudinally extending and mutually perpendicular slots that engage and support the cross members at the central apertures. The pin also maintains the cross members in the desired orthogonal relationship.

To complete the assembly, the upper and lower halves of the inner and outer rings are brazed to the spider member and the cross members. These ring components are preferably formed by simple machining operations. The brazing material is preferably introduced in the form of washer-like annuluses that are sandwiched between the upper and lower ring components and the spider member during assembly. When the components are thus assembled, the unit is heated to a temperature which fuses the brazing material. This step simultaneously brazes the assembly at various locations to form an integral flexure mount. The width of the radial slots in the rings is selected so that the liquid braze material flows into the slots through a capillary action to secure the vertical cross members. Finally, the outer ring and the sandwiched annular portion of the spider are cut at four equiangularly spaced points to form four independent sectors of the outer ring each centered on one of the four or more flexure arms.

These and other features and objects of the invention will become apparent to those skilled in the art from the following detailed description of the preferred embodiments which should be read in light of the accompanying drawings.

DETAILED DESCRIPTION OF THE PREFERRED EMBODIMENTS

Figure 1:
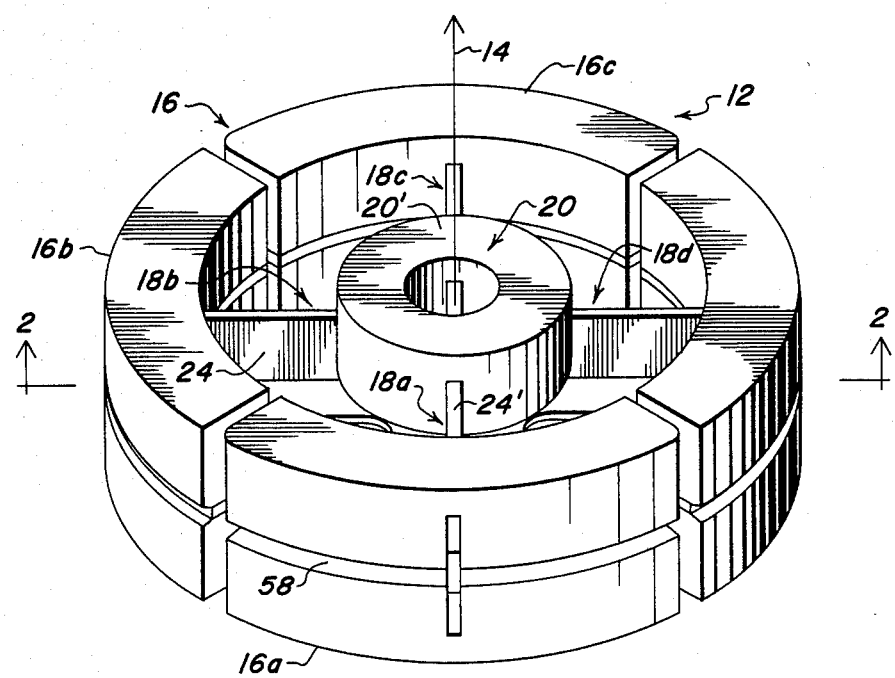
FIG. 1 is a perspective view of a flexure mount according to the present invention (with the central alignment pin omitted) used for a dynamically tuned gyroscope which couples two sectors of an outer ring through an inner gimbal ring, to another two sectors of an outer ring.
Figure 2:
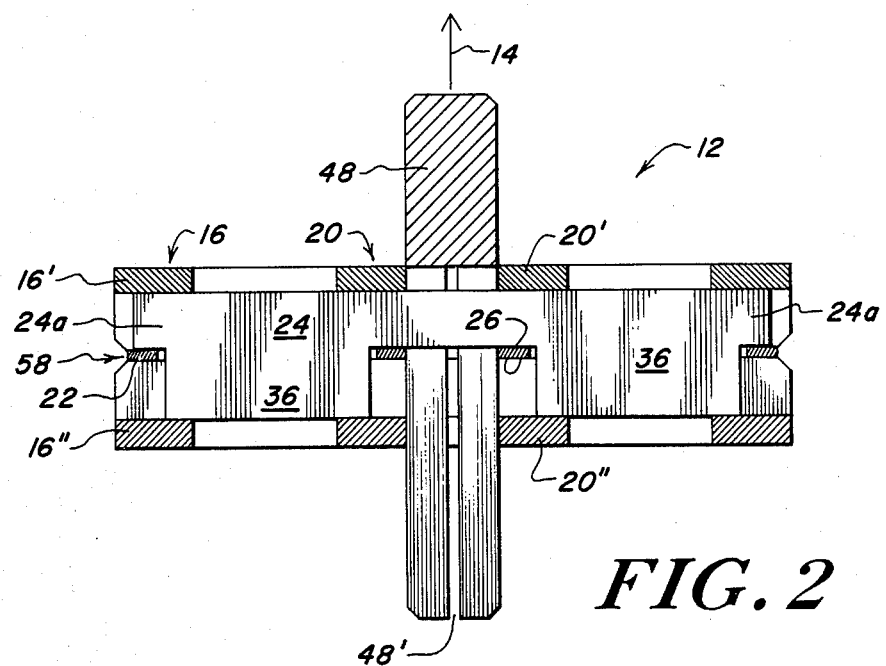
FIG. 2 is a view in vertical section and partially in side elevation taken along the line 2—2 in FIG. 1 but with the alignment pin included.
Figure 3:
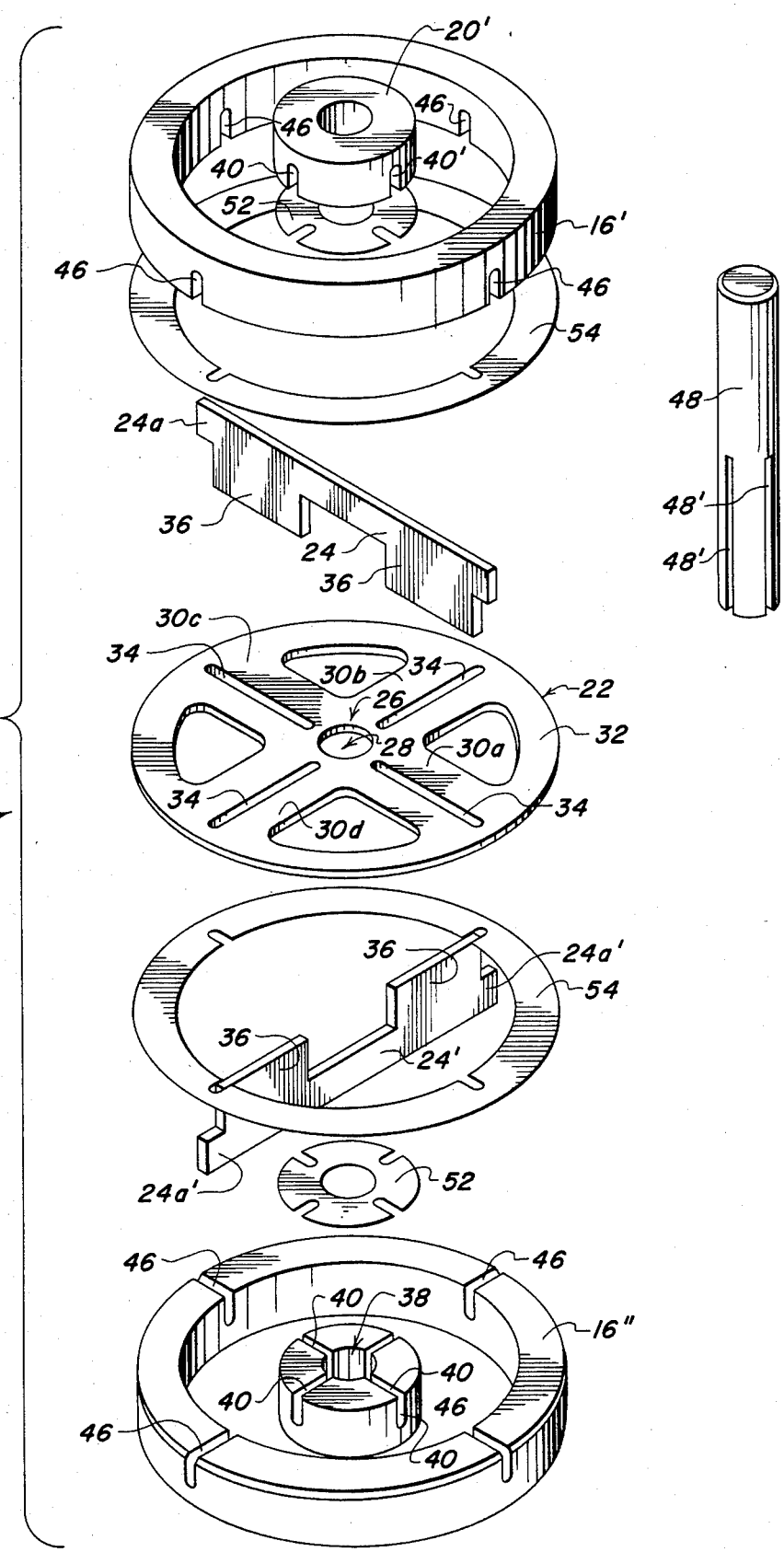
FIG. 3 is an exploded perspective view of the assembly shown in FIGS. 1 and 2 before the outer ring is cut into sectors.

FIGS. 1–3 show a rotor or flexure assembly 12 for a dynamically tuned gyroscope according to the present invention for transmitting power from a drive shaft (not shown) rotating about a spin axis 14 to portions of an outer ring 16. The outer ring 16 is divided into four sections, 16a, 16b, 16c, and 16d, that are equiangularly spaced about the spin axis and have substantially the same inertial mass. The drive shaft is operatively coupled to a diametrically opposed pair of the ring sections such as sections 16a and 16c. A rotor (not shown) is typically attached to the remaining two diametrically opposed sections 16b and 16d which typically have slightly larger outside diameter than the section 16a and 16c. The assembly 12 provides a universal coupling between the drive shaft and the rotor through four flexure arms 18a, 18b, 18c, and 18d, each of which extends radially from an inner gimbal ring 20 to the center of an associated section of the outer ring 16. Since the flexure arms 18a . . . 18d are elastically resilient, this arrangement provides a universal coupling between the drive shaft and the rotor; that is, the rotor has two degrees of freedom of motion with respect to the drive shaft. Each flexure arm 18a . . . 18d has a cross shaped cross section which is characterized by a high axial and radial load carrying capacity. This design is also usually characterized by low torsional spring rate.

The flexural components of the assembly 12 are formed by three interlocking components, a spider member 22 and a pair of identical cross flexure members 24 and 24′. The spider 22 is oriented generally transversely to the spin axis 14 of the rotor assembly 12. For the purposes of this description, the spin axis 14 is considered as vertically oriented; the spider member is therefore oriented generally horizontally. The cross members 24 and 24′ and the spider 22 are mutually orthogonal to one another.

The spider has a central portion 26 which is centered on the spin axis 14. The central portion 26 includes a generally circular aperture 28 which is itself centered on the spin axis 14. The spider also has four radially extending webs 30a, 30b, 30c, and 30d which terminate in an outer annular portion 32 which is concentric about the spin axis 14. The webs 30a . . . 30d are equiangularly spaced. Each web includes a radially oriented slot 34 which extends from the central portion 26 into the outer annulus 32 and is generally coincident with the radial center line of the associated web. The spider 22 as a whole is designed so that it has a substantially uniform distribution of inertial mass about the spin axis 14.

The cross flexure members 24 and 24′ each have a generally rectangular configuration but with a pair of key portions 36, 36 extending from one longitudinal edge of each member. The key portions are themselves generally rectangular and extend freely, with a clearance on all sides, through an associated slot 34. One pair of key portions, those associated with the member 24 as shown, project downwardly while the key portions 36, 36 associated with the cross member 24' extend generally upwardly. The height of the key portions and the cross members in the vertical direction are selected so that when they are fully seated in the radial slots (with the adjacent longitudinal edge of the cross member abutting the spider 22), the cross members extend above and below the spider the same distance. The length of each key portion 36 is selected to extend from the inner ring 20 to the outer ring 16, but not the full length of the associated slot 34. A significant advantage of the present invention is that the members 22, 24 and 24' can be etched, stamped or otherwise formed from precision rolled sheet material and has a substantially uniform thickness together with the desired structural and thermoelastic properties. The aperture 28 can be etched or stamped in the same operation or reamed or drilled in a subsequent operation. A suitable material is a 300 series precipitation hardening stainless steel. The direction of the grain of the material or of the rolling is preferably selected to be coincident with the longitudinal axis of the cross members and midway between adjacent webs of the spider. It should be noted that each of these three components of the flexure mount are substantially planar.

The inner gimbal ring 20 is formed by two identical components, an upper half 20' and a lower half 20" which each have a generally cylindrical configuration. Each half 20' and 20" has a central, vertically extending aperture 38 which aligns with the aperture 28 and has substantially the same diameter. Each half 20' and 20" also includes a pair of mutually perpendicular slots 40, 40 that extend across the opposed faces of each ring half. The cross members fit closely in the corresponding slots 40, 40 to assist in supporting and locating the cross members in the desired vertical orientation with respect to the spider. However, the slots 40, 40 are slightly wider than the thickness of the flexure members to facilitate the flow of a brazing material by capillary action to the adjoining surfaces of these elements. The inner ring 20 can, of course, be trimmed to vary its inertia and thereby vary the tuned speed of the gyroscope. Alternatively, separate trim members can be added to the assembly.

Like the inner gimbal ring 20, the outer ring 16 is formed from upper and lower halves 16' and 16". The halves 16' and 16" are substantially identical and can be formed through straightforward machining operations. The halves 16' and 16" are each a continuous ring with a generally rectangular cross section. Each outer ring half 16' and 16" also includes a mutually perpendicular set of horizontal slots 46, 46. The slots 46, 46 are positioned to receive the outer ends 24a, 24a' of the vertical cross members 24 and 24' in a generally close-fitting relationship. Both the slots 40, 40 and 46, 46 are adapted to receive the ends of the key members 36. Like the slots 40, 40, the slots 46, 46 are usually somewhat wider than the thickness of the cross flexure members to facilitate a flow of brazing material to these surfaces.

The rotor assembly 12 includes an alignment pin 48 which is held closely in the aligned apertures 28 and 38 as is best seen in FIG. 2. The pin is preferably round in cross-section and has a pair of longitudinally extending slots 48', 48' that are mutually perpendicular. The slots receive, support, and align the cross members 24, 24' with respect to the spin axis and with respect to the spider and inner gimbal ring. The support function of the alignment pin also, in part, makes the assembly, to a large extent, self-jigging.

Annular or washer-like forms of braze material such as the braze elements 52, 52 and 54, 54 (FIG. 3) are sandwiched between the inner and outer ring halves and the spider. Alternatively, the braze material can be inserted as a rod-like slug in a series of braze holes (not shown) formed in the ring halves.

When the braze material reaches the fusing temperature, it flows to the adjacent surfaces of the rings and the spider, including the slots of the vertical cross members and the rings, and secures these members to one another.

It is also possible to use the braze holes in conjunction with annular brazing reliefs formed in the ring halves.

The above described components according to this invention are particularly adapted to a rapid and low cost assembly technique which requires little or no skill. Assembly according to this invention preferably utilizes only a simple jigging fixture (not shown) that supports the rings and has a central hole to accept the pin 48 and is concentric with the outer rings.

To assemble the components, the lower outer ring half 16" and the lower inner ring half 20" are connected by the lower cross member 24' which is seated in two slots 40, 40 of the inner ring and two slots 46, 46 of the outer ring. The brazing material 52, 54 is placed on the lower ring halves 16" and 20". The spider 22 is then fitted over these components with the upwardly projecting key portions 36 of the cross member 24' engaging two slots 34, 34. The upper cross member is assembled by inserting the downwardly projecting key portions 36 into the remaining two radial slots 34, 34. The alignement pin 48 is inserted in the aligned apertures 28 and 38 of the inner gimbal ring and the spider with each slot lying at one corner of the crossed pair of vertical members 24, 24'. The brazing material 52 and 54 are inserted on the spider 22. Next the upper halves 20' and 16' of the inner gimbal ring and the outer ring, respectively, are assembled onto the spider with the upper vertical cross member 24 secured in the remaining vertical slots of the inner and outer rings. End portions of the upwardly projecting key portions 36, 36 are also secured in slots of the upper halves 20' and 16'.

It should be noted that this flexure assembly utilizes comparatively simple components and machining techniques, but is nevertheless, to a large extent, self-aligning and self-jigging. The alignments of the inner gimbal ring and spider with respect to the spin axis and one another are provided by the alignment pin 48 in cooperation with the cross members 24, 24' as described above. The cross members are secured in desired spacial orientation by the pin, and the slots in the inner and outer rings.

The assembled components are secured to one another in the desired relationship by heating the assembly to a point where the brazing material fuses and secures the inner and outer ring halves to the intermediate, "sandwiched" spider member. The brazing also secures the ends and center of the cross members 24 and 24' to the inner and outer rings and to the adjoining portions of the spider. The invention therefore allows the simultaneous brazing of all the components of the assembly with brazing operations performed at multiple locations at the same time.

Any standard braze material and techniques for the material selected can be used. A material which has been found to be useful is a silver alloy with a melting point of approximately 1300° F. During the brazing, the assembly is also heat treated and aged by heating it to 1800° F., cooling it slowly to room temperature, then down to −100° F., and back up to room temperature. Brazing is preferably done in a vacuum without a flux. During the brazing excess braze material will flow to the chamfer 58 formed at the outer edge of the outer ring 16 and the slots of the alignment pin 48 where it will automatically distribute itself evenly. Because there is a significant clearance between the key portions and the radial slots 34, the braze material does not flow down the slots 34. This ensures that the spider and vertical members will flex independently of one another. Once brazed and cooled, the outer ring and sandwiched portions of the outer annular portion 32 of the spider and of the outer ring can be cut into four independent sectors 16a . . . 16d as shown in FIG. 1.

By way of illustration, but not of limitation, the following dimensions are representative of a rotor assembly of the type shown in FIGS. 1-3. The spider and cross vertical flexure members 24 and 24' are formed from a sheet steel having a thickness approximately 0.0030 inch. The spider has an outer diameter approximately 0.44 inch and the radial slots have a width of approximately 0.017 inch. The cross members have an overall length of approximately 0.43 inch and a height, exclusive of the key portions 36, of approximately 0.385 inch. The key portions 36 each have a height of 0.0415 inch and a length of 0.160 inch. Each outer ring half has a outer diameter of 0.4497 inch and an inner diameter of 0.3502 inch with the vertical slots 46, 46 extending radially to a depth of approximately 0.040 inch with a width of 0.005 inch. Each half 16' and 16'' has a height of approximately 0.120 inch. The inner ring preferably has a maximum outer diameter of 0.150 inch, a minimum outer diameter of 0.065 inch and each half has a height of approximately 0.058 inch. The pin 48 extends 0.34 inch with a diameter of 0.0626 inch. The slots 48' extend 0.223 inch and have a width of 0.005 inch.

Figure 4:
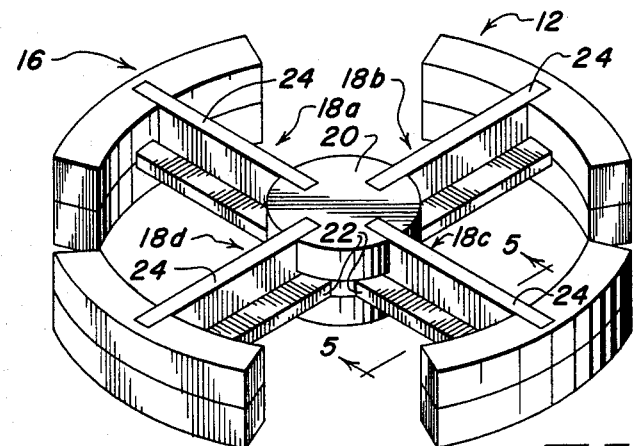
FIG. 4 is a perspective view taken of an alternative, five piece flexure mount according to the present invention.
Figure 5:
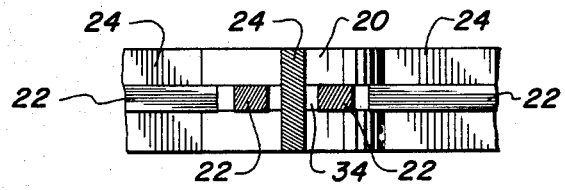
FIG. 5 is a view taken along the line 5—5 of FIG. 4 with portions broken away.

FIGS. 4 and 5 show an alternative, "five-piece" embodiment of the present invention (like parts being assigned the same reference numbers) which employs the basic features of this invention. An inner ring 20 is connected to an outer ring 16 by four flexure arms 18a-18d. Each arm incorporates one web of a horizontal spider 22. A principal difference is that the vertical flexure members 24 for each arm are separate parts (increasing the total number of flexures from three to five as compared to the FIGS. 1-3 embodiment). Another difference is that the vertical members 24 engage the rings 16 and 20 in vertical slots formed on the radially facing surfaces of the rings. Yet another difference is that there is no central alignment pin. Rather, the lengths of the vertical members, seated firmly in the receiving ring slots, locate and align the component parts with respect to one another. As in the FIGS. 1-3 embodiment, however, the vertical members each have "key" portions which extend freely through the associated webs with a clearance to allow an independence of action of the vertical and horizontal flexural elements of the mount.

It has been found that the flexure mount described above, particularly when used in a dynamically tuned gyroscope, provides the structural and thermo-elastic properties of a costly, highly machined one-piece flexure mount, but with a markedly lower cost of manufacture. In particular, the flexure mount is preferably formed from three elements having comparatively simple configurations which can be fabricated from relatively low cost sheet material. When used to mount the components of the dynamically tuned gyroscope, the associated inner and outer rings can be formed with simple machining operations. The invention also provides an assembly which secures the various components into a single integral unit through simultaneous brazing operations at multiple locations. The brazing operation does not require complex and costly fixtures typically used in prior art construction techniques.

While the invention has been described with respect to its preferred embodiments used to mount the components of a dynamically tuned gyroscope to provide a universal coupling between a drive shaft and a rotor, various alterations and modifications will become apparent to those skilled in the art from the foregoing description and accompanying drawings. Such modifications and alterations are intended to fall within the scope of the appended claims.

What is claimed and is desired to be secured by Letters Patent is:

1. A two degree of freedom flexure mount that couples a drive shaft to an outer inertial element connected to an outer ring that is rotating about a spin axis through an inner ring that is surrounded by and substantially coaxial with said outer ring, comprising a plurality of equiangularly spaced flexure arms each extending between and secured to said inner ring and said outer ring, said flexure arms each having a horizontal web portion aligned substantially transverse to said spin axis and a vertical flexure member oriented substantially perpendicular to said horizontal web portion and having upper and lower portions disposed on opposite sides of said web portion, said web portion and flexure member being formed from a resilient structural sheet material having a substantially uniform thickness, and said web and vertical portions of each of said flexure arms being substantially continuous from said inner ring to said outer ring to provide uniform and reliably known axial, radial and torsional spring rates for each of said flexure arms said horizontal webs each extending from a central portion which together with said webs forms a substantially planar spider member that is symmetrical about the spin axis.

2. A flexure mount according to claim 1 where said spider has four equiangularly spaced webs.

3. A flexure mount according to claim 2 wherein each of said webs has a radially extending slot formed therein and said vertical flexure members comprise first and second vertical flexure members each having two key portions which extend through two of said slots located on diametrically opposite sides of said spin axis, the key portions of one of said first and second vertical members forming the upper portions of two of said flexure arms and the key portions of the other of said first and first vertical members forming the lower portions of the remaining two of said flexure arms.

4. A flexure mount according to claim 3 when said spider member includes a substantially circular aperture centered on said spin axis.

5. A flexure assembly according to claim 4 wherein said inner ring has a central aperture aligned with and having substantially the same diameter as the central aperture of said spider member and further comprising an alignment member held in said aligned apertures.

6. A flexure mount according to claim 5 wherein said alignment member is a generally cylindrical pin.

7. A flexure mount according to claim 5 wherein said alignment member has a set of mutually perpendicular slots that extend generally in the direction of said spin axis and are adapted to receive, align and support said first and second vertical members.

8. A flexure mount according to claim 1 wherein said inner and outer rings each comprise an upper and a lower portion that are secured to and sandwich said spider member.

9. A flexure mount according to claim 8 wherein said inner and outer ring portions each have a set of slots formed in their faces opposite said spider member, said slots being adapted to receive said first and second cross members.

10. A flexure mount according to claim 9 wherein said slots are closely spaced from said cross members.

11. A flexure mount according to claim 8 wherein said spider mount has an outer annular portion that is at least in part secured between the upper and lower portions of said outer ring.

12. A flexure mount according to claim 1 wherein said plurality of flexure arms is four and said outer ring is divided into four sectors that are each secured to and uniquely associated with one of said flexure arms.

13. A flexure mount according to claim 12 wherein said drive shaft is operatively coupled to a first diametrically opposed pair of said outer ring sectors and a rotor is operatively coupled to the other sectors of said outer ring.

14. A flexure mount according to claim 3 wherein said slot extends at least from the outer diameter of said inner gimbal ring to the inner diameter of said outer ring and has a width in excess of the width of said key portions.

15. A flexure mount according to claim 3 wherein the key portions of said first and second vertical flexure members extend radially from at least the outer diameter of said inner ring to at least the inner diameter of said outer ring.

16. A method of manufacturing a flexure assembly comprising,
forming from a structural sheet material of substantially uniform thickness a spider member including a central hub portion and a plurality of equiangularly spaced webs each extending radially from said central hub portion with a central radial slot extending substantially the length of said web,
forming from a structural sheet material of substantially uniform thickness a plurality of cross flexure members each having generally rectangular configuration with a pair of generally rectangular key portions extending from one of its longitudinal edges,
providing upper and lower halves of an inner ring,
providing upper and lower halves of an outer ring,
interlocking said cross flexure members with said spider member by inserting said key portions in said radial slots,
positioning said inner ring halves on opposite sides of said central spider portion,
positioning said outer ring halves in opposite sides of said outer ends of said spider webs, and
simultaneously brazing said inner ring halves to said spider, said outer ring halves to said spider and said cross flexure members to said inner and outer ring halves.

17. The method of claim 16 further comprising the steps of:
forming a central aperture in said spider member,
forming a central aperture in said inner ring halves;
providing an alignment member adapted to engage said apertures, and
inserting said alignment member in said apertures, to align said inner ring halves with said spider member.

18. The method of claim 16 further comprising the steps of forming a set of slots in said inner and outer ring halves adapted to receive the ends of said cross members and the key portions.

19. The method of claim 17 further comprising the steps of forming a pair of longitudinally extending and mutually perpendicular slots in said alignment member and inserting said cross flexure members in said slots.

20. The method of claim 16 further including the steps of providing annular brazing material between said inner ring halves and said spider member and between said outer ring halves and said spider member and heating said rotor assembly to a temperature that fuses said brazing material.

21. The method of claim 16 further comprising the step of segmenting said outer ring halves and the intermediate portions of said spider into sectors that are each centered on one flexure arm defined by one of said webs and the associated portion of one of said cross flexure members and one of its key portions.

* * * * *